US012694142B2

(12) United States Patent
Chen et al.

(10) Patent No.: US 12,694,142 B2
(45) Date of Patent: Jul. 28, 2026

(54) MEMORY ACCESS PROCESSING METHOD AND APPARATUS, COMPUTER DEVICE, STORAGE MEDIUM, AND COMPUTER PROGRAM PRODUCT

(71) Applicant: Glenfly Tech Co., Ltd., Shanghai (CN)

(72) Inventors: Ruiyang Chen, Shanghai (CN); Wei Chen, Shanghai (CN); Jin Shao, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 203 days.

(21) Appl. No.: 18/630,567

(22) Filed: Apr. 9, 2024

(65) Prior Publication Data

US 2025/0238539 A1     Jul. 24, 2025

(30) Foreign Application Priority Data

Jan. 22, 2024    (CN) .......................... 202410090423.0

(51) Int. Cl.
*G06F 21/62*     (2013.01)
*G06F 21/71*     (2013.01)
*G06F 21/78*     (2013.01)
*G06F 21/79*     (2013.01)

(52) U.S. Cl.
CPC ................................ *G06F 21/6218* (2013.01)

(58) Field of Classification Search
None
See application file for complete search history.

(56) References Cited

U.S. PATENT DOCUMENTS 10,635,309 B2 * 4/2020 Schade ............... G06F 11/1004

FOREIGN PATENT DOCUMENTS

| CN | 116776333 A | * | 9/2023 | ............. | G06F 21/79 |
| WO | WO-2017028642 A1 | * | 2/2017 | ............. | G06F 21/62 |

* cited by examiner

*Primary Examiner* — Venkat Perungavoor
(74) *Attorney, Agent, or Firm* — Nixon Peabody LLP

(57) ABSTRACT

The present disclosure relates to a memory access processing method and apparatus, a computer device, a storage medium and a computer program. The method includes: acquiring a memory access request transmitted by a hardware module, the memory access request carrying a protection identifier, an access type, and an access area corresponding to the hardware module, the hardware module being pre-assigned with the corresponding protection identifier, and a memory area that the hardware module needs to access being pre-assigned to a memory region corresponding to an access permission; determining the memory region in which the access area is located; determining whether the protection identifier corresponding to the hardware module has the access permission for a corresponding access type to the memory region; and responding to the memory access request when the protection identifier corresponding to the hardware module has the access permission for the corresponding access type to the memory region.

12 Claims, 3 Drawing Sheets

S202 a memory access request transmitted by a hardware module is acquired; the memory access request carries a protection identifier, an access type, and an access area corresponding to the hardware module

S204 a memory region in which the access area is located is determined

S206 it is determined whether a protection identifier corresponding to a hardware module has an access permission for a corresponding access type to the memory region

S208 when the protection identifier corresponding to the hardware module has the access permission for the corresponding access type to the memory region, the memory access request is responded to

MEMORY ACCESS PROCESSING METHOD AND APPARATUS, COMPUTER DEVICE, STORAGE MEDIUM, AND COMPUTER PROGRAM PRODUCT

CROSS REFERENCES TO RELATED APPLICATION

The present application claims priority to Chinese patent application No. 202410090423.0, titled "Memory Access Processing Method and Apparatus, Computer Device, Storage Medium, and Computer Program Product", and filed on Jan. 22, 2024, the content of which is hereby incorporated by reference in its entirety.

TECHNICAL FIELD

The present disclosure relates to the field of data protection technology, and particularly to a memory access processing method and apparatus, a computer device, a storage medium, and a computer program product.

BACKGROUND

In recent years, the video industry has flourished, and users have gradually got into the habit of paying for the video content. Increasing and protecting revenue is a focus for many content providers and video platforms. On the other hand, the high-quality original content is also the most important driving force of the video industry, and by protecting intellectual property rights and cracking down on piracy, the prosperity of the video industry can be maintained. Accordingly, how to protect the video content is an urgent problem to be solved.

A technology used for protecting a digital copyright is referred to as Digital Rights Management (DRM). The DRM is a system in which an encryption technology is utilized to protect video content, keys (encryption key and decryption key) are securely stored and transmitted by means of a professional technology, and a content producer is allowed to set business rules to limit a content viewer. The DRM can protect the video content from being illegally copied and downloaded, or used and propagated without authorization.

A specific implementation process of the DRM includes: the content provider registers with the DRM service provider and acquires MI key Encryption Key and the key identifier KeyId. The content provider uses the acquired Encryption Key to encrypt the content by using an encryption algorithm (usually AES-128), and uploads the key identifier KeyID together with the encrypted video to a Content Delivery Network (CDN). When the encrypted video is played on a client side, the client side transmits a key request to the DRM service provider by using the key identifier KeyID as a video identifier. The DRM service provider authenticates the client permission. If the access is authorized, the DRM service provider transmits a key to the client side. After receiving the decryption key, the client side decrypts the video bit stream by using the key, decodes images by using a video decoder and transmits the decoded images to a screen. In the process of decoding the images with the video decoder and transmitting the decoded images to the screen, the bit stream and the decoded images needs to be protected from being illegally acquired.

In the conventional technologies, it is relatively safe to place the decrypted bit stream in a protected area, and the decoding and display are completely performed by the hardware. In this case, the hardware needs to have the read permission of the specified protected area, and has the capability of protecting the key data from being leaked during the decoding and display.

Specifically, in order to support the DRM, the hardware manages the memory access by using a memory access filter Memory Filter. The memory filter is located on a hardware-to-memory interface. Read/write access to the memory requests from all modules in the hardware need to include a protection identifier Protect_ID, and the memory access filter filters the protection identifiers to determine whether to allow a corresponding request according to a certain rule.

One implementation mode of a scenario controlled by the DRM with the memory filter is to classify each possible memory area Surface according to a data protection requirement, and set a corresponding protection identifier Protect_ID for each memory area Surface to construct a list similar to Table 1. When a memory read/write request of a corresponding address is transmitted, the table is looked up to acquire a corresponding protection identifier Protect_ID for accessing a corresponding memory area surface. For example, when the memory area surface to be accessed is between Address_A0 and Address_A1, ID_0 is used.

TABLE 1

Memory area Surface mapping table and binding between the memory area Surface and the protection identifier Protect_ID

| Surface_Type | Start_Address | End_Address | Protect_ID |
|---|---|---|---|
| Surface_A | Address_A0 | Address_A1 | ID_0 |
| Surface_B | Address_B0 | Address_B1 | ID_1 |
| . . . | . . . | . . . | . . . |
| Surface_E | Address_E0 | Address_E1 | ID_1 |
| . . . | . . . | . . . | . . . |

However, in the above solution, because the codec supports multiple codec types, it relate to multiple memory types, so that and construction of Table 1 is very complicated. In addition, if Table 1 is tampered with, a memory area Surface_X needing protection is camouflaged to a memory area without needing protection, that is, the protection identifier Protect_ID is changed from needing protection to without needing protection, which may cause data leakage.

SUMMARY

In view of this, as for the technical problem described above, it is necessary to provide a memory access processing method and apparatus, a computer device, a computer-readable storage medium, and a computer program product capable of guaranteeing the data security.

In the first aspect of the present disclosure, a memory access processing method is provided, including: acquiring a memory access request transmitted by a hardware module, the memory access request carrying a protection identifier, an access type, and an access area corresponding to the hardware module, the hardware module being pre-assigned with the corresponding protection identifier, and a memory area that the hardware module needs to access being pre-assigned to a memory region corresponding to an access permission; determining the memory region in which the access area is located; determining whether the protection identifier corresponding to the hardware module has the access permission for a corresponding access type to the memory region; and responding to the memory access request when the protection identifier corresponding to the hardware module has the access permission for the corresponding access type to the memory region.

In an embodiment, the method may further include: acquiring an access permission of each access identifier to each memory region; determining a memory area that each hardware module corresponding to the hardware needs to access; assigning a corresponding protection identifier to each hardware module based on the memory area that each hardware module needs to access; and assigning the memory area that each hardware module needs to access to a corresponding memory region at a driving end based on the access permission of each protection identifier of each hardware module to each memory region.

In an embodiment, the method may further include: determining a memory area that a newly added hardware module needs to access when the hardware has the newly added hardware module, and assigning a corresponding protection identifier to the newly added hardware module; and assigning the memory area that the newly added hardware module needs to access to a corresponding memory region based on an access permission of the protection identifier of the newly added hardware module to each memory region.

In an embodiment, the assigning the corresponding protection identifier to each hardware module based on the memory area that each hardware module needs to access may include: assigning different protection identifiers to different access types of each hardware module based on the memory area that each hardware module needs to access.

In an embodiment, the acquiring the access permission of each access identifier to each memory region may include: acquiring an access permission of each access identifier to each memory region predefined in a memory filter which is provided by a third party or is hardware-attached.

In an embodiment, the hardware module is in a video encoder or a video decoder, and a hardware module shared by the video encoder and the video decoder has the same protection identifier.

In the second aspect of the present disclosure, a memory access processing apparatus is provided, including: an access request acquisition module, configured to acquire a memory access request transmitted by a hardware module, the memory access request carrying a protection identifier, an access type, and an access area corresponding to the hardware module, the hardware module being pre-assigned with the corresponding protection identifier, and a memory area that the hardware module needs to access being pre-assigned to a memory region corresponding to an access permission; an memory region determination module, configured to determine the memory region in which the access area is located; a permission acquisition determination module, configured to determine whether the protection identifier corresponding to the hardware module has the access permission for a corresponding access type to the memory region; and a response module, configured to respond to the memory access request when the protection identifier corresponding to the hardware module has the access permission for the corresponding access type to the memory region.

In the third aspect of the present disclosure, a computer device is provided, including a processor and a memory storing a computer program, the processor, when executing the computer program, implements the steps of the method of any one of the above embodiments.

In the fourth aspect of the present disclosure, a computer-readable storage medium is provided, on which a computer program is stored, the computer program, when executed by a processor, causes the processor to implement the steps of the method of any one of the above embodiments.

In the fifth aspect of the present disclosure, a computer program product is provided, including a computer program, wherein the computer program, when executed by a processor, causes the processor to implement the steps of the method of any one of the above embodiments.

As for the above-mentioned memory access processing method and apparatus, the computer device, the storage medium, and the computer program product, the data protection types are distinguished according to the modules, that is, the relationship between the module and the protection identifier is established, and the memory area that the module needs to access is pre-assigned to the memory region corresponding to the access permission. In such a manner, after the memory access request is acquired, the memory region in which the access area is located is determined, and it is determined whether the protection identifier corresponding to the module has the access permission for the corresponding access type to the memory region. If yes, the corresponding memory access request is responded to. Therefore, the data protection types are distinguished based on the modules, which has advantages that the implementation is simple, the compatibility with most codec architectures is good, and no data protection type is tampered with.

BRIEF DESCRIPTION OF THE DRAWINGS

In order to describe the technical solution in the embodiments of the present disclosure or the related technologies more clearly, the accompanying drawings required for describing the embodiments or the related technologies will be briefly introduced. Obviously, the accompanying drawings in the following description show merely some embodiments of the present disclosure, and a person of ordinary skill in the art may still obtain other drawings from these accompanying drawings without creative efforts.

DETAILED DESCRIPTION

In order to make the purpose, the technical solution and advantages of the present disclosure clearer, the present disclosure will be elaborated in further detail with reference to the accompanying drawings and embodiments. It should be appreciated that the specific embodiments described herein are merely intended to explain the present disclosure, rather than limiting the present disclosure.

Figure 1:
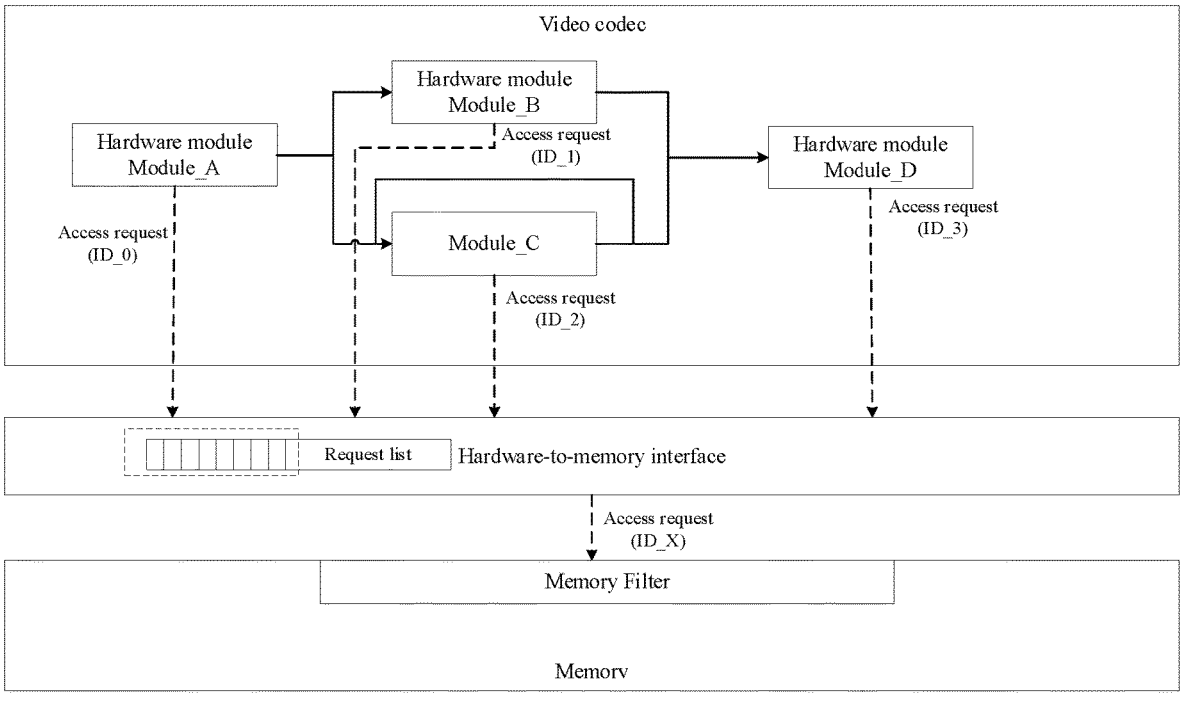
FIG. 1 is an application environment diagram of a memory access processing method according to an embodiment.

The memory access processing method provided in the embodiments of the present disclosure can be applied to the application environment as shown in FIG. 1. A hardware module may transmit a memory access request to a hardware-to-memory interface for caching, and a memory filter may filter the cached memory access requests in the hardware-to-memory interface. For example, protection identifiers are filtered according to a certain rule to determine whether to allow corresponding access requests.

The hardware module may be a hardware module in a hardware that implements any digital rights management (DRM), such as hardware module in a video encoder or a video decoder. Taking the video decoder as an example, the hardware module may include but is not limited to an entropy decoding hardware module, an inverse quantization/inverse transformation hardware module, a reconstruction hardware module, an intra prediction hardware module, a motion compensation hardware module, a motion vector hardware module, an in-loop filtering hardware module, and the like.

The memory filter defines multiple groups of access permissions between protection identifiers and memory areas. The memory filter may be provided by a third party, or may be hardware-attached. For ease of description, Table 2 is taken as an example. The memory filter defines a set of memory access restriction conditions defined by a protection identifier Protect_ID and an address region Address_Region. Table 2 provides an example defining memory access restrictions, in which all accessible memory regions are divided into eight non-overlapping regions Region0 to Region7. The protection identifier Protect_ID is a 4-bit number, and can represent a total of 16 IDs from 0 to 15. In the Table 2, Rd/Wt of each cell represents a read/write access permission of each protection identifier Protect_ID to each region, for example, Rd=1 represents read permission, Rd=0 represents no read dispermission, Wt=1 represents write permission, and Wt=0 represents no write permission. In this example, the request of Protect_ID=ID_0 is allowed to read and write to Region_0, but is not allowed to read and write to Region_2. The request of Protect_ID=ID_15 is allowed to read and write to Region_0 and Region_2. The Table 2 is only an example. Actually, the number of regions and the range of Protect_ID are defined by a designer of the memory filter.

TABLE 2

| Read and write permissions defined by Protect_ID and Region | | | | |
|---|---|---|---|---|
| Protect_ID | Region_0 | Region_1 | Region_2 | ... | Region_7 |
| ID_0 | Rd = 1 | Rd = 1 | Rd = 0 | ... | Rd = 0 |
| | Wt = 1 | Wt = 0 | Wt = 0 | | Wt = 0 |
| ID_1 | Rd = 0 | Rd = 1 | Rd = 0 | ... | Rd = 0 |
| | Wt = 0 | Wt = 1 | Wt = 0 | | Wt = 0 |
| ... | ... | ... | ... | ... | ... |
| ID_15 | Rd = 1 | Rd = 0 | Rd = 1 | ... | Rd = 0 |
| | Wt = 1 | Wt = 1 | Wt = 1 | | Wt = 0 |

In such a manner, after receiving the access request, the memory filter first determines an access type, and then looks up the above Table 2 according to the access type to determine whether the access type is permissioned. If yes, the memory filter executes the corresponding access request, and otherwise, the memory filter denies the access request.

In the embodiment, the memory filter acquires a memory access request transmitted by a hardware module, the memory access request carries a protection identifier, an access type, and an access area corresponding to the hardware module. Each hardware module is pre-assigned with a corresponding protection identifier, and a memory area that each hardware module needs to access is pre-assigned to a memory region corresponding to the access permission. A memory region in which the access area is located is determined. It is determined whether the protection identifier corresponding to the hardware module has an access permission of a corresponding access type of the memory region. When the protection identifier corresponding to the hardware module has the access permission for the corresponding access type to the memory region, the memory access request is responded to. In such a manner, the data protection types are distinguished according to the modules, that is, a relationship between the module and the protection identifier is established, and the memory area that the module needs to access is pre-assigned to the memory region corresponding to the access permission. Accordingly, after the memory access request is acquired, the memory region in which the access area is located is determined, and it is determined that whether the protection identifier corresponding to the module has the access permission for the corresponding access type to the memory region. If yes, the corresponding memory access request is responded to. The data protection types are distinguished based on the modules, which has advantages that the implementation is simple, compatibility with most codec architectures is good, and no data protection type is tampered with.

The application environment of the memory access request shown in FIG. 1 may be a memory of any computer device such as a terminal memory or a server memory. The terminals may be but are not limited to various personal computers, laptops, smartphones, tablets, Internet of Things devices, and portable wearable devices. The Internet of Things device may be an intelligent sound box, an intelligent television, an intelligent air conditioner, or an intelligent in-vehicle device. The portable wearable device may be a smart watch, a smart bracelet, a head device, or the like. The server may be implemented by using an independent server or a server cluster composed of multiple servers.

Figure 2:
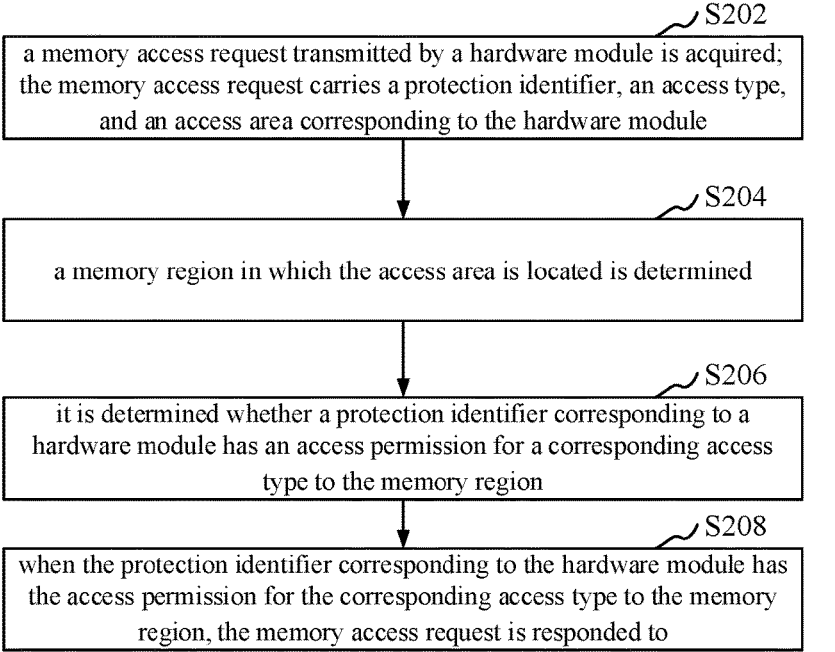
FIG. 2 is a flow chart of a memory access processing method according to an embodiment.

In an exemplary embodiment, as shown in FIG. 2, a memory access processing method is provided, and the method is applied to the memory filter in FIG. 1 as an example for description. The method may include the following steps S202 to S208.

S202: a memory access request transmitted by a hardware module is acquired. The memory access request carries a protection identifier, an access type, and an access area corresponding to the hardware module.

Each hardware module is pre-assigned with a corresponding protection identifier, and a memory area that each hardware module needs to access is pre-assigned to a memory region corresponding to an access permission.

The memory access request is transmitted by the hardware module, and may be pre-cached in a hardware-to-memory interface. The memory filter acquires, from the interface, the memory access request transmitted by the hardware module. In other embodiments, the memory access request may also be directly transmitted by the hardware module to the memory filter.

The protection identifier is an identifier for implementing data protection. In the present disclosure, data protection types are distinguished according to the hardware modules, and each hardware module is pre-assigned with a corresponding protection identifier. The codec hardware is taken as an example, which includes a plurality of hardware modules. A function of a hardware module determines whether the hardware module needs to read or write content protected in the memory, that is, whether the hardware module needs to read or write content in a corresponding memory area. In this way, a protection identifier is assigned to each hardware module according to data to be accessed by each hardware module. It should be noted that the protection identifier is only related to the hardware module. One hardware module may correspond to one or more fixed protection identifiers, and multiple hardware modules may correspond to the same protection identifier. In other words, the hardware module and the protection identifier may be in a one-to-one relationship, a many-to-one relationship, or a one-to-many relationship, which is not specifically limited herein.

Referring to Table 3, Table 3 shows protection identifiers assigned to various hardware modules.

TABLE 3

| Hardware module | Protection identifier Protect_ID |
|---|---|
| Hardware module Module_A | Protection identifier ID_0 |
| Hardware module Module_B | Protection identifier ID_1 |
| . . . | . . . |

The access type may include at least one of a read type or a write type.

The access area is a memory area in which data to be accessed by each hardware module is located. Whether a hardware module needs to access a memory area is determined by the hardware itself and is independent of the data protection. For example, during encoding and decoding, a memory area that each hardware module of the codec needs to access is determined by the codec.

The memory area that the hardware module needs to access is pre-assigned to the memory region corresponding to the access permission. Specifically, at a driving end, the memory area that each hardware module needs to access is pre-assigned to a memory region corresponding to the read/write access permission. For example, if the hardware module Module_A needs to read/write data in the memory area Surface_a, but does not need to read/write data in the memory area Surface_b, the memory area Surface_a is assigned to the memory region Region with the protection identifier ID_0Rd=1, Wt=1, and the memory area Surface_b is assigned to the memory region Region with the protection identifier ID_0Rd=0, Wt=0.

S204: a memory region in which the access area is located is determined.

Since the memory region corresponding to the memory area is pre-configured at the driving end, the memory region in which the access area is located can be directly obtained based on a corresponding relationship between the memory area and the memory region.

S206: it is determined whether a protection identifier corresponding to a hardware module has an access permission for a corresponding access type to the memory region.

S208: when the protection identifier corresponding to the hardware module has the access permission for the corresponding access type to the memory region, the memory access request is responded to.

The access permission between the protection identifier and the memory region is predefined by the memory filter, reference can be made to the specific example in Table 2. In this way, based on the access permissions between multiple groups of protection identifiers and the memory regions, the memory filter can determine whether the protection identifier corresponding to the hardware module has the access permission for the corresponding access type to the memory region.

Figure 3:
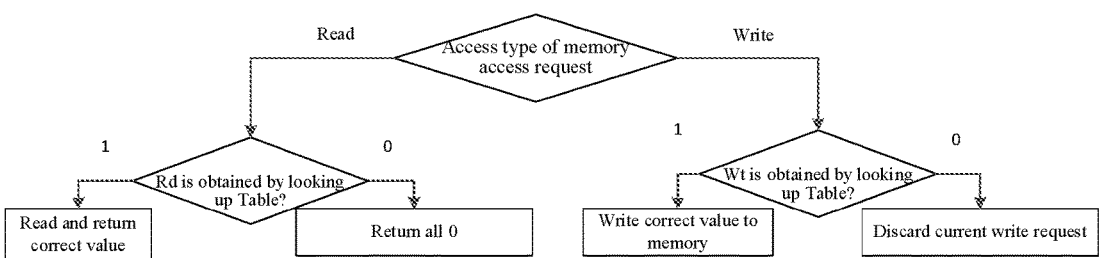
FIG. 3 is a schematic diagram of steps performed by a memory filter according to an embodiment.

Referring to FIG. 3, FIG. 3 is a schematic diagram of steps performed by a memory filter according to an embodiment. In the embodiment, the memory filter first determines an access type, for example, the read type or the write type, and then performs subsequent steps in respective branches.

When the access type is the read type, the table of access permissions between the protection identifiers and the memory regions is looked up, i.e., Table 2, and it is determined, based on the access read permission of the memory region corresponding to the protection identifier, whether to perform the normal read and return a correct value, or return all 0. Table 2 is taken as an example. If the hardware module with the protection identifier ID_0 has a read request for the memory region Region_0, since Rd=1, the read is normally performed. If the hardware module with the protection identifier ID_1 has a read request for the memory region Region_0, since Rd=0, all 0 are returned.

When the access type is the write type, the table of access permissions between the protection identifiers and the memory regions is queried, i.e., Table 2, and it is determined, based on the access write permission of the memory region corresponding to the protection identifier, whether to write the correct value to the memory or discard the current write request. Table 2 is taken as an example. If the hardware module with the protection identifier ID_0 has a write request for the memory region Region_0, since Wt=1, the correct value is written into the memory. If the hardware module with the protection identifier ID_1 has a write request for the memory region Region_0, since Wt=0, the current write request is discarded.

In the above-mentioned memory access processing method, the data protection types are distinguished according to the modules, that is, the relationship between the module and the protection identifier is established, and the memory area that the module needs to access is pre-assigned to the memory region corresponding to the access permission. In such a manner, after the memory access request is acquired, the memory region in which the access area is located is determined, and it is determined whether the protection identifier corresponding to the module has the access permission for the corresponding access type to the memory region. If yes, the corresponding memory access request is responded to. The data protection types are distinguished based on the modules, which has advantages that the implementation is simple, the compatibility with most codec architectures is good, and no data protection type is tampered with.

In an embodiment, the above-mentioned method may further include: an access permission of each access identifier to each memory region is acquired; a memory area that each hardware module corresponding to the hardware needs to access is determined; a corresponding protection identifier is assigned to each hardware module based on the memory area that each hardware module needs to access; and the memory area that the hardware module needs to access is assigned to the corresponding memory region at the driving end based on the access permission of the protection identifier of the hardware module to each memory region.

In an embodiment, the step of acquiring the access permission of each access identifier to each memory region may include: an access permission of each access identifier to each memory region predefined in the memory filter is acquired. The memory filter is provided by a third party or is hardware-attached.

Figure 4:
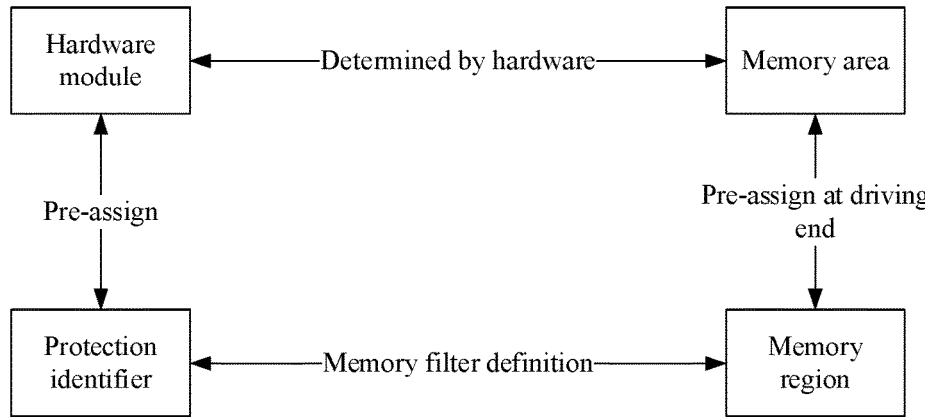
FIG. 4 is a schematic diagram of corresponding relationships according to an embodiment.

For ease of understanding, as shown in FIG. 4, FIG. 4 is a schematic diagram showing corresponding relationships in an embodiment. The present disclosure relates to relationships among a hardware module, a protection identifier, a memory area, and a memory region. A relationship between the hardware module and the memory area is determined by the hardware, that is, the codec itself, and is not related to the data protection. The access permission between the protection identifier and the memory region is defined by the memory filter which may be provided by a third party or the hardware-attached.

The relationship between each hardware module and the protection identifier is preset. For example, a proper protection identifier is pre-assigned to each hardware module based on data to be accessed by each hardware module. For example, both the hardware modules Module_A and Module_B need to access data in the memory area A, and the data in the memory area A needs to be protected. Accordingly, the same protection identifier is assigned to the hardware modules Module_A and Module_B. If the hardware modules Module_A and the Module_B need to access different data, different protection identifiers are respectively assigned to the hardware modules Module_A and the Module_B. In this way, the protection identifier Protect_ID is only related to the hardware module. One hardware module has a fixed protection identifier Protect_ID, and multiple hardware modules may also correspond to the same protection identifier Protect_ID.

In an optional embodiment, the step of assigning the corresponding protection identifier to each hardware module based on the memory area that each hardware module needs to access may include: different protection identifiers are assigned to different access types of each hardware module based on the memory area that each hardware module needs to access.

In the embodiment, data read and written by the hardware module is located in different access areas. Accordingly, different protection identifiers are assigned to the read and write of the hardware module, for example, the read of the hardware module is assigned with a protection identifier ID_0, and the write of the hardware module is assigned with a protection identifier ID_1.

The relationship between the memory area and the memory region is assigned by the driving end, that is, the memory area that each hardware module needs to access is assigned to the memory region of the corresponding read/write access permission. For the specific assignment procedures, reference can be made to the above description, which are not repeated herein again.

In such a manner, when needing to access the memory, the hardware module transmits a memory access request carrying a protection identifier. The hardware-to-memory interface receives and stores the memory access request in a request list, and transmits the memory access request to the memory filter in a first in first out (FIFO) sequence. The memory filter determines, based on the memory region in which the access area requested by the received memory access request is located and the protection identifier, whether to execute the memory access request according to the procedure shown in FIG. 3.

In the above embodiment, the data protection types are distinguished according to the hardware modules. Compared to the method in the background technology that the data protection types are distinguished according to the memory types, the method of the present disclosure has advantages that the implementation is simple, the compatibility with most codec architectures is good, and no data protection type is tampered with. In addition, the construction method of the protection identifier Protect_ID is simple, and is bound to the hardware modules, and there is no need to deal with the complicated memory usages corresponding to various codecs. The good compatibility is adapted to various codec design architectures, provided that each hardware module is assigned with a correct protection identifier Protect_ID.

In an optional embodiment, the above method may further include: when the hardware has a newly added hardware module, a memory area that the newly added hardware module needs to access is determined, and a corresponding protection identifier is assigned to the newly added hardware module; the memory area that the newly added hardware module needs to access is assigned to a corresponding memory region based on an access permission of the protection identifier of the newly added hardware module to each memory region.

When the hardware has some newly added hardware modules, such as some newly added codec supports, it is only necessary to synchronously add mapping between each newly added hardware module of the codec and a protection identifier. In this way, a relationship between the newly added hardware module and the original memory area may be determined, and then it is determined whether a new protection identifier is added or the original protection identifier is used, and a protection identifier corresponding to each newly added hardware module is determined.

If a protection identifier is newly added, the memory area that the newly added hardware module needs to access is assigned to the corresponding memory region. If the original protection identifier is adopted, that is, the same as the protection identifier of the existing hardware module, the assignment of the memory area is performed at the driving end.

According to the above, the number of hardware modules of one video codec is fixed, the hardware modules are clearly defined at architecture layers, and a mapping relationship between a hardware module and a protection identifier is very clear. If some codec supports are newly added in the hardware, it is sufficient to synchronously add mapping between the a new hardware module and a protection identifier.

In addition, if a drive patch for the existing hardware is based on, since the hardware modules are still used, the access permission of the memory and the patch are the same as before, and there is no need to perform the modification.

In the above embodiment, when a new module is added, there is no need to consider the impact on other hardware modules, provided that a correct protection identifier Protect_ID is assigned according to a function of the new hardware module, so that the extension is easy, and when a drive patch is performed, no read/write permission problem is caused due to the newly added memory usage. In addition, the read/write permission is completely controlled by the hardware and cannot be tampered with.

In an optional embodiment, the hardware module is in a video encoder or a video decoder, and a hardware module shared by the video encoder and the video decoder has the same protection identifier.

Figure 5:
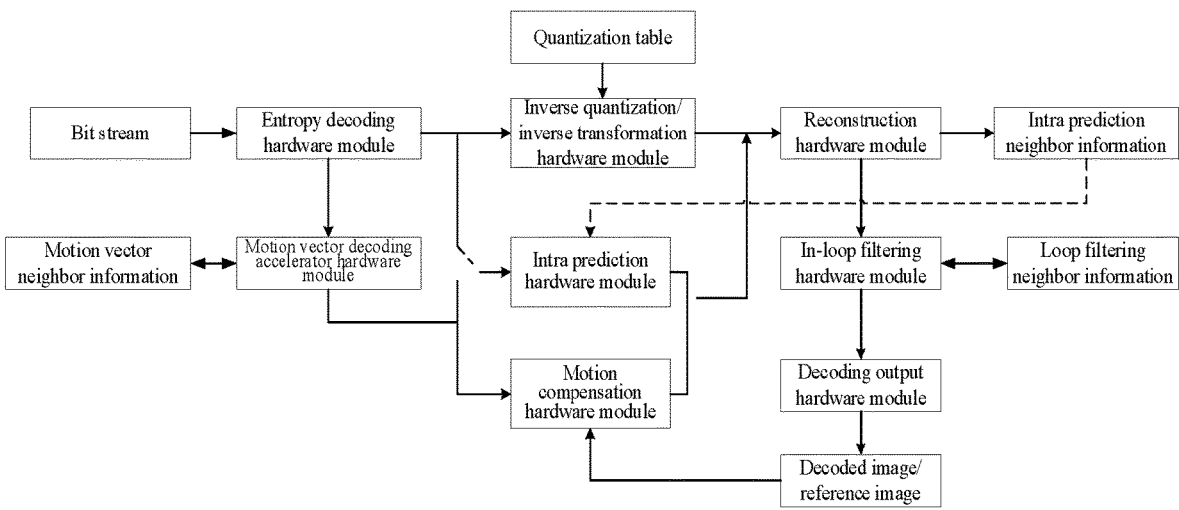
FIG. 5 is a block diagram of a video decoder according to an embodiment.

For ease of understanding, referring to FIG. 5, FIG. 5 is a block diagram of a video decoder according to an embodiment. The process from inputting the bit stream to outputting decoded images by the video decoder may need to go through an entropy decoding hardware module, a Motion Vector Decoding Accelerator hardware module, a inverse quantization/inverse transformation hardware module, an intra prediction hardware module, a motion compensation hardware module, a reconstruction hardware module, an in-loop filtering hardware module, and a decoding output hardware module. The decoding procedure may involve a memory including a bit stream, a decoded image/reference image, intra-frame predicted neighbor information, inter-frame predicted motion vector neighbor information, a quantization table of transformation and quantization, filtered neighbor information, etc. The bit stream, the decoded image/reference image are data needing to be protected, while other information data does not need protection.

The entropy decoding hardware module needs to access a bit stream, the bit stream is located in the memory area Surface_A, accordingly the access permission of the protection identifier Protect_ID of the entropy decoding hardware module to the memory region where the memory area Surface_A is located should be set to Rd=1 and Wt=0. The Motion Vector Decoding Accelerator hardware module has no need to read the bit stream, and inputs of the Motion Vector Decoding Accelerator hardware module is from the entropy decoding hardware module. A generated result of the motion vector is stored in a fixed format into the memory area Surface_B. The access permission of the protection identifier Protect_ID of the Motion Vector Decoding Accelerator hardware module to the memory region where the memory area Surface_A is located should be set to Rd=0 and Wt=0, and to the memory region where the memory area Surface_B is located should be set to Rd=1 and Wt=1. Conversely, the entropy decoding hardware module has no need to access the memory area Surface_B, so that the access permission of the entropy decoding hardware module to the memory area Surface_B is Rd=0, Wt=0, thereby preventing the entropy decoding hardware module from writing the bit stream into the memory area Surface_B, and being read and leaked by the unsafe Motion Vector Decoding Accelerator hardware module.

In an optional embodiment, data needing to be protected may be placed in the memory region Region_0, and data that does not need to be protected may be placed in the memory region Region_1. Two protection identifiers Protect_ID and corresponding access permissions are defined in following Table 4.

TABLE 4

| Access Constraints for Protect_ID/Region | | |
|---|---|---|
| Protect_ID | Region_0 | Region_1 |
| ID_0 | Rd = 1 | Rd = 1 |
| | Wt = 1 | Wt = 0 |
| ID_1 | Rd = 0 | Rd = 1 |
| | Wt = 0 | Wt = 1 |

That is, the hardware module needing to be protected is bound to the protection identifier ID_0 which allows to read all memory regions but only allows to write data to the memory region Region 0. The hardware module that does not need to be protected is bound to the protection identifier ID_1 which only allows to read and write to the memory region Region 1. As for the video decoder, the bit stream and the decoding/reference image are placed in the memory region Region 0, while other data is placed in the memory region Region 1.

In the above embodiment, only the video decoder is taken as an example for description. The processing of the encoder is the same as that of the decoder, while only the content needing to be protected is replaced by an original input image, an encoding bit stream, and a reconstructed image. In this way, it may be discovered whether a hardware module (for example, the reconstruction hardware module in an encoder) shared by the encoder and the decoder needs to be protected for the same submodule when encoding/decoding has the consistent result, that is, the binding of the protection identifier Protect_ID is independent of the current encoding or decoding situation. Accordingly, the hardware module shared by the video encoder and the video decoder has the same protection identifier.

It should be appreciated that, although steps in the flow charts involved in the above embodiments are sequentially displayed according to an order indicated by the arrows, these steps are not definitely sequentially performed in the order indicated by the arrows. Unless expressly stated in the specification, these steps are not definitely performed in a strict order, but may be performed in other orders. In addition, at least a part of steps in the flow charts involved in the above embodiments may include multiple steps or multiple phases. These steps or phases are not definitely performed at the same moment, but may be performed at different moments. These steps or phases are not definitely performed sequentially, but may be performed in turns or alternately with other steps or at least a part of steps or phases in other steps.

Based on the same inventive concept, in an embodiment of the present disclosure, a memory access processing apparatus for implementing the above-mentioned memory access processing method is provided. The implementation solution provided by the apparatus is similar to that described in the above-mentioned method. Therefore, for the specific limitations in the following provided one or more embodiments of the memory access processing apparatus, reference can be made to the limitations on the memory access processing method described above, and details will not be repeated herein.

Figure 6:
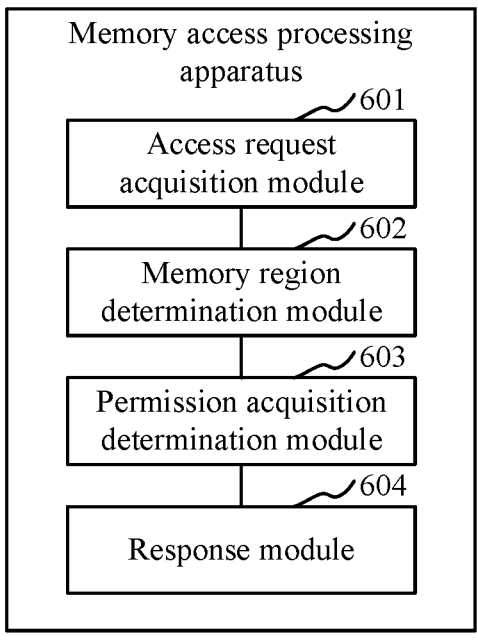
FIG. 6 is a schematic structure diagram of a memory access processing apparatus according to an embodiment.

In an exemplary embodiment, as shown in FIG. 6, a memory access processing apparatus is provided, which includes: an access request acquisition module 601, a memory region determination module 602, a permission acquisition determination module 603, and a response module 604.

The access request acquisition module 601 is configured to acquire a memory access request transmitted by a hardware module; the memory access request carries a protection identifier, an access type, and an access area corresponding to the hardware module; each hardware module is pre-assigned with a corresponding protection identifier, and a memory area that each hardware module needs to access is pre-assigned to a memory region corresponding to an access permission.

The memory region determination module 602 is configured to determine the memory region in which the access area is located.

The permission acquisition determination module 603 is configured to determine whether a protection identifier corresponding to a hardware module has the access permission for a corresponding access type to the memory region.

The response module 604 is configured to respond to the memory access request when the protection identifier corresponding to the hardware module has the access permission for the corresponding access type to the memory region.

In an embodiment, the apparatus may further include a configuration module configured to acquire an access permission of each access identifier to each memory region, determine a memory area that each hardware module corresponding to the hardware needs to access, assign a corresponding protection identifier to each hardware module based on the memory area that each hardware module needs to access, and assign the memory area that each hardware module needs to access to a corresponding memory region at a driving end based on the access permission of the protection identifier of the hardware module to each memory region.

In an optional embodiment, the above-mentioned configuration module is further configured to: determine a memory area that a newly added hardware module needs to access when the hardware has the newly added hardware module, assign a corresponding protection identifier to the newly added hardware module, and assign the memory area that the newly added hardware module needs to access to a corresponding memory region based on an access permission of the protection identifier of the newly added hardware module to each memory region.

In an optional embodiment, the above-mentioned configuration module is further configured to assign different protection identifiers to different access types of each hardware module based on the memory area that each hardware module needs to access.

In an optional embodiment, the above-mentioned configuration module is further configured to acquire an access permission of each access identifier to each memory region predefined in the memory filter which is provided by a third party or is hardware-attached.

In an optional embodiment, the hardware module is in a video encoder or a video decoder, and a hardware module shared by the video encoder and the video decoder has the same protection identifier.

All modules in the aforementioned memory access processing apparatus may be implemented in whole or in part by using software, hardware, and a combination thereof. The above-mentioned modules may be embedded in or independent of a processor of a computer device in a hardware form, or may be stored in a memory of the computer device in a software form, so that the processor can invoke to execute operations corresponding to the above-mentioned modules.

Figure 7:
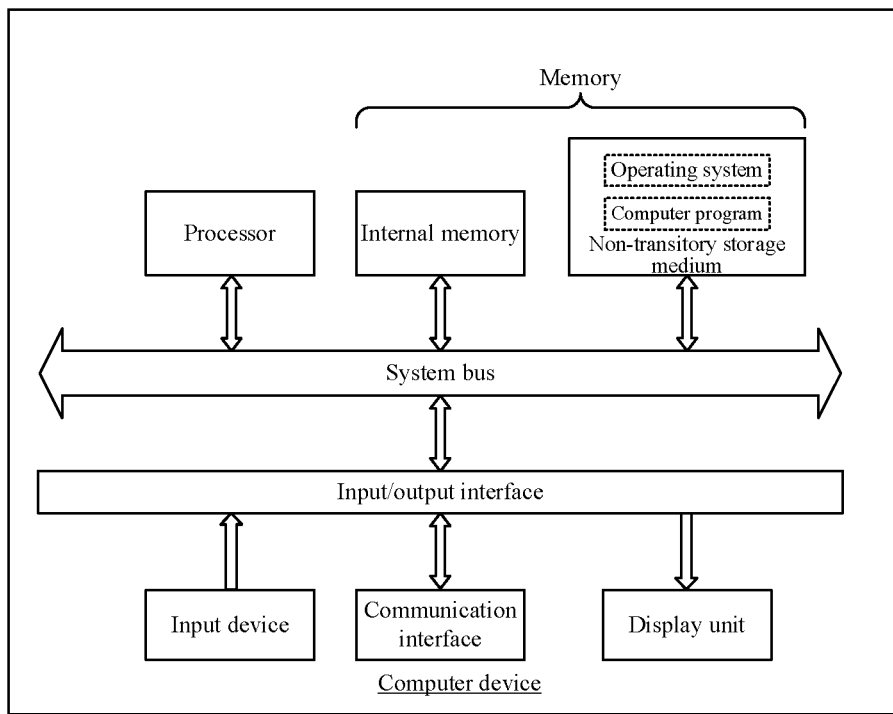
FIG. 7 is a diagram of an internal structure of a computer device according to an embodiment.

In an exemplary embodiment, a computer device is provided. The computer device may be a terminal, and an internal structure diagram of the computer device may be as shown in FIG. 7. The computer device includes a processor, a memory, an input/output interface, a communication interface, a display unit, and an input device. The processor, the memory, and the input/output interface are connected to each other through a system bus; the communication interface, the display unit, and the input device are connected to the system bus through the input/output interface. The processor of the computer device is configured to provide computing and controlling capabilities. The memory of the computer device includes a non-transitory storage medium and an internal memory. The non-transitory storage medium stores an operating system and a computer program. The internal memory provides an environment for running the operating system and the computer program in the non-transitory storage medium. The input/output interface of the computer device is configured to exchange information between the processor and an external device. The communication interface of the computer device is configured to communicate with an external terminal in a wired or wireless mode. The wireless mode may be implemented through WIFI, a mobile cellular network, a near field communication (NFC), or other technologies. The computer program is executed by a processor to implement a memory access processing method. The display unit of the computer device is configured to form a visual picture, which may be a display screen, a projection device, or a virtual reality imaging device. The display screen may be a liquid crystal display screen or an electronic ink display screen. The input device of the computer device may be a touch layer covering the display screen, or may be a key, a trackball, or a touchpad provided on a housing of the computer device, or may be an external keyboard, a touchpad, or a mouse, etc.

It should be appreciated by those skilled in the art that FIG. 7 is merely a block diagram of a partial structure related to the solution of the present disclosure, and does not constitute a limitation on a computer device to which the solution of the present disclosure is applied. A specific computer device may include more or less components than those shown in the figures, or combine some components, or have a different component arrangement.

In an embodiment, a computer device is further provided, including a processor and a memory storing a computer program. When executing the computer program, the processor may implement the steps in the above-mentioned method embodiments.

In an embodiment, a computer-readable storage medium is provided, on which a computer program is stored. When being executed by a processor, the computer program may cause the processor to implement the steps in the above-mentioned method embodiments.

In an embodiment, a computer program product is provided, including a computer program. When being executed by a processor, the computer program may cause the processor to implement the steps in the above-mentioned method embodiments.

It should be appreciated by those skilled in the art that all or a part of the processes in the above-mentioned method embodiments may be implemented by a computer program instructing related hardware. The computer program may be stored in a non-transitory computer-readable storage medium. When the computer program is executed, the processes in the above method embodiments may be included. Any reference to a memory, a database, or other media used in the embodiments provided in the present disclosure may include at least one of a non-transitory memory or a transitory memory. The non-transitory memory may include a Read-Only Memory (ROM), a magnetic tape, a floppy disk, a flash memory, an optical memory, a high-density embedded non-volatile memory, a Resistive Random Access Memory (ReRAM), a Magnetoresistive Random Access Memory (MRAM), a Ferroelectric Random Access Memory (FRAM), a Phase Change Memory (PCM), a graphene memory, and the like. The transitory memory may include a Random Access Memory (RAM), an external cache, or the like. As an illustration and not a limitation, the RAM may be in multiple forms, such as a Static Random Access Memory (SRAM) or a Dynamic Random Access Memory (DRAM). The database involved in the embodiments provided in the present disclosure may include at least one of a relational database or a non-relational database. The non-relational database may include a block chain based distributed database or the like, which is not limited thereto. The processor in the embodiments provided in the present disclosure may be a general purpose processor, a central processing unit, a graphics processor, a digital signal processor, a programmable logic device, a quantum computing-based data processing logic device, or the like, which is not limited thereto.

The technical limitations in the above embodiments can be combined in any manner. In order to make the description concise, all possible combinations of the technical limitations in the above embodiments are not described. However, as long as there is no contradiction in the combination of these technical limitations, theses combinations are considered to fall within the scope of the present disclosure.

The above-mentioned embodiments are merely some exemplary embodiments of the present disclosure, and the descriptions thereof are relatively specific and detailed, but should not be construed as a limitation on the scope of the present disclosure. It should be pointed out that those skilled in the art can make several transformations and improvements without departing from the concept of the present disclosure, which all fall within the protection scope of the present disclosure. Therefore, the scope of protection of the present disclosure is subject to the appended claims.

What is claimed is:

1. A memory access processing method, comprising:

acquiring a memory access request transmitted by a hardware module, the memory access request carrying a protection identifier, an access type, and an access area corresponding to the hardware module, the hardware module being pre-assigned with the corresponding protection identifier, and a memory area that the hardware module needs to access being pre-assigned to a memory region corresponding to an access permission;

determining the memory region in which the access area is located;

determining whether the protection identifier corresponding to the hardware module has the access permission for a corresponding access type to the memory region; and responding to the memory access request when the protection identifier corresponding to the hardware module has the access permission for the corresponding access type to the memory region;

further comprising:

acquiring an access permission of each access identifier to each memory region;

determining a memory area that each hardware module corresponding to the hardware needs to access;

assigning a corresponding protection identifier to each hardware module based on the memory area that each hardware module needs to access; and assigning the memory area that each hardware module needs to access to a corresponding memory region at a driving end based on the access permission of each protection identifier of each hardware module to each memory region.

2. The method according to claim 1, further comprising:

determining a memory area that a newly added hardware module needs to access when the hardware has the newly added hardware module, and assigning a corresponding protection identifier to the newly added hardware module; and assigning the memory area that the newly added hardware module needs to access to a corresponding memory region based on an access permission of the protection identifier of the newly added hardware module to each memory region.

3. The method according to claim 1, wherein the assigning the corresponding protection identifier to each hardware module based on the memory area that each hardware module needs to access comprises:

assigning different protection identifiers to different access types of each hardware module based on the memory area that each hardware module needs to access.

4. The method according to claim 1, wherein the acquiring the access permission of each access identifier to each memory region comprises:

acquiring an access permission of each access identifier to each memory region predefined in a memory filter which is provided by a third party or is hardware-attached.

5. The method according to claim 1, wherein the hardware module is in a video encoder or a video decoder, and a hardware module shared by the video encoder and the video decoder has the same protection identifier.

6. A memory access processing apparatus, comprising:

a processor and a memory for storing program instructions executed by the processor;

wherein the processor is configured to:

acquire a memory access request transmitted by a hardware module, the memory access request carrying a protection identifier, an access type, and an access area corresponding to the hardware module, the hardware module being pre-assigned with the corresponding protection identifier, and a memory area that the hardware module needs to access being pre-assigned to a memory region corresponding to an access permission;

determine the memory region in which the access area is located;

determine whether the protection identifier corresponding to the hardware module has the access permission for a corresponding access type to the memory region; and respond to the memory access request when the protection identifier corresponding to the hardware module has the access permission for the corresponding access type to the memory region;

acquire an access permission of each access identifier to each memory region, determine a memory area that each hardware module corresponding to the hardware needs to access, assign a corresponding protection identifier to each hardware module based on the memory area that each hardware module needs to access, and assign the memory area that each hardware module needs to access to a corresponding memory region at a driving end based on the access permission of the protection identifier of the hardware module to each memory region.

7. The apparatus according to claim 6, wherein the processor is further configured to be capable of executing the stored program instructions to: determine a memory area that a newly added hardware module needs to access when the hardware has the newly added hardware module, assign a corresponding protection identifier to the newly added hardware module, and assign the memory area that the newly added hardware module needs to access to a corresponding memory region based on an access permission of the protection identifier of the newly added hardware module to each memory region.

8. The apparatus according to claim 6, wherein the processor is further configured to be capable of executing the stored program instructions to assign different protection identifiers to different access types of each hardware module based on the memory area that each hardware module needs to access.

9. The apparatus according to claim 6, wherein the processor is further configured to be capable of executing the stored program instructions to acquire an access permission of each access identifier to each memory region predefined in the memory filter which is provided by a third party or is hardware-attached.

10. The apparatus according to claim 6, wherein the hardware module is in a video encoder or a video decoder, and a hardware module shared by the video encoder and the video decoder has the same protection identifier.

11. A computer device, comprising a processor and a memory storing a computer program, wherein the processor, when executing the computer program, is configured to:

acquire a memory access request transmitted by a hardware module, the memory access request carrying a protection identifier, an access type, and an access area corresponding to the hardware module, the hardware module being pre-assigned with the corresponding protection identifier, and a memory area that the hardware module needs to access being pre-assigned to a memory region corresponding to an access permission;

determine the memory region in which the access area is located;

determine whether the protection identifier corresponding to the hardware module has the access permission for a corresponding access type to the memory region;

respond to the memory access request when the protection identifier corresponding to the hardware module has the access permission for the corresponding access type to the memory region;

acquire an access permission of each access identifier to each memory region;

determine a memory area that each hardware module corresponding to the hardware needs to access;

assign a corresponding protection identifier to each hardware module based on the memory area that each hardware module needs to access; and assign the memory area that each hardware module needs to access to a corresponding memory region at a driving end based on the access permission of each protection identifier of each hardware module to each memory region.

12. A non-transitory computer-readable storage medium, on which a computer program is stored, wherein the computer program, when executed by a processor, causes the processor to implement the steps of the method of claim 1.

\* \* \* \* \*